United States Patent [19]

Lin

[11] Patent Number: 5,454,546
[45] Date of Patent: Oct. 3, 1995

[54] WATER FAUCET MECHANISM

[76] Inventor: Shao-Hsi Lin, 58, Ma Yuan West St., Taichung, Taiwan, Prov. of China

[21] Appl. No.: 360,012

[22] Filed: Dec. 19, 1994

[51] Int. Cl.⁶ .................................................. F16K 1/34
[52] U.S. Cl. ........................ 251/210; 251/215; 251/221; 251/225
[58] Field of Search ........................ 251/210, 215, 251/218, 221, 222, 318, 273, 225; 137/315

[56]  References Cited
U.S. PATENT DOCUMENTS

| 2,272,351 | 2/1942  | Polcari        | 251/218   |
|-----------|---------|----------------|-----------|
| 3,991,973 | 11/1976 | Politz et al.  | 251/210   |
| 4,176,674 | 12/1979 | Rodriguez      | 251/221 X |
| 4,408,745 | 10/1983 | Swiers et al.  | 251/215 X |

*Primary Examiner*—Martin P. Schwadron
*Assistant Examiner*—Kevin L. Lee

[57]  ABSTRACT

A water faucet includes an inlet, an outlet and an opening formed between the inlet and outlet. A cylindrical member extends upward from the opening. A sleeve is secured to the body. A rod is threadedly engaged in the sleeve. A cap is secured to the lower portion of the rod and includes a peripheral flange dependent from the cap for slidably engaging with the cylindrical member and includes a convex lump for engaging with the inner peripheral surface of the cylindrical member so as to make a water tight seal with the cylindrical member.

3 Claims, 5 Drawing Sheets

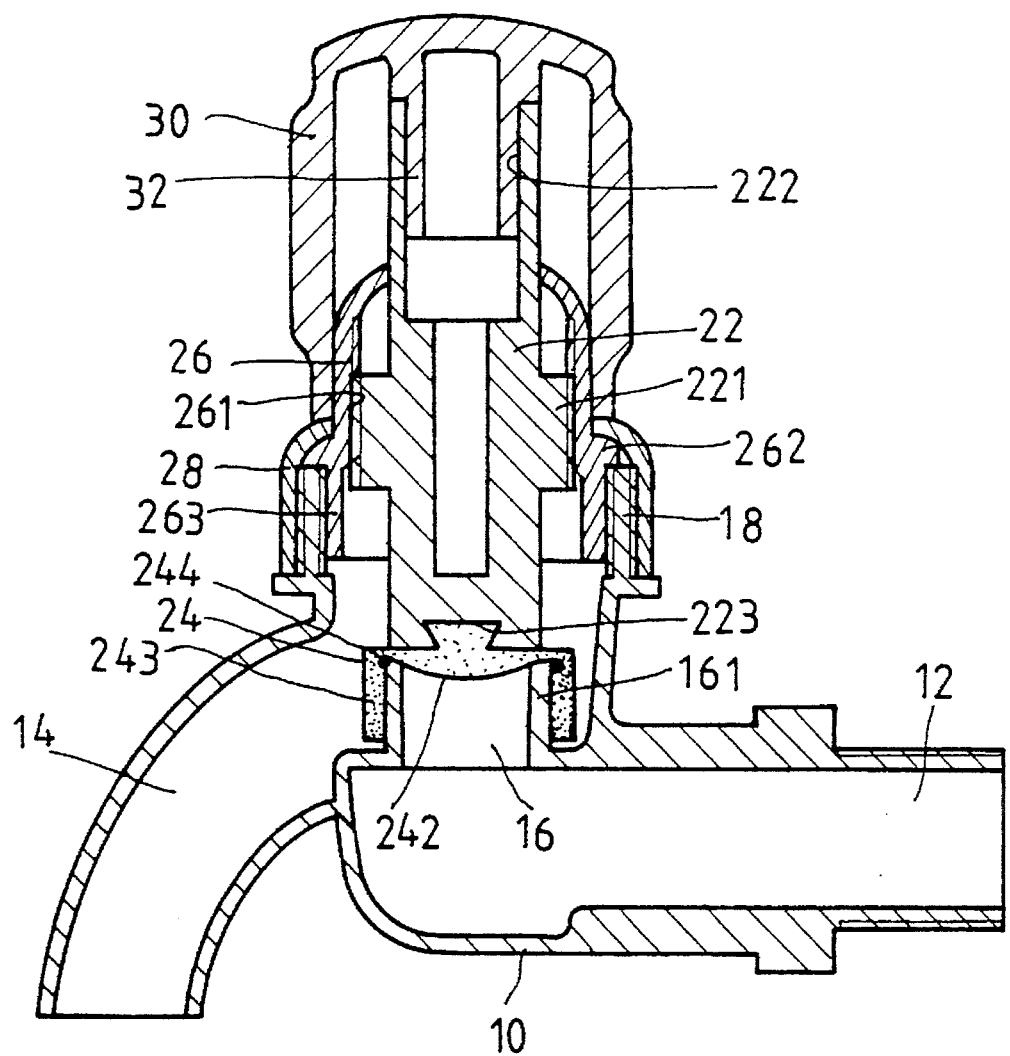
F I G. 3

5,454,546

WATER FAUCET MECHANISM

BACKGROUND OF THE INVENTION

1. Field of the Invention

The present invention relates to a faucet, and more particularly to a water faucet mechanism.

2. Description of the Prior Art

A typical faucet is disclosed in FIG. 5 and comprises a body 4 including a pipe 41 and a mouth 42 having an opening 43 formed therebetween, and an inner thread 44 formed above the opening 43. A control device 5 includes a rod 51 threadedly engaging with the inner thread 44. A pad 52 is secured to the bottom of the rod 51 and includes a bottom surface 521 for engaging with the body 4 so as to enclose the opening 43. A knob 53 is engaged on top of the rod 51 for rotating the rod and for forcing the pad 52 to enclose the opening 43. The pad 52 should be tightly forced to engage with the body 4 so as to enclose the opening 43. Water leakage will usually occur between the contact surfaces of the pad 52 and the device 4.

The present invention has arisen to mitigate and/or obviate the afore-described disadvantages of the conventional faucets.

SUMMARY OF THE INVENTION

The primary objective of the present invention is to provide a water faucet mechanism in which the water opening can be easily enclosed and sealed.

In accordance with one aspect of the invention, there is provided a water faucet mechanism comprising a body including a water inlet, a water outlet and an opening formed between the water inlet and the water outlet, the opening including a peripheral portion, a cylindrical member extended upward from the peripheral portion of the opening and including an outer peripheral surface and an inner peripheral surface, the body including a cylindrical wall formed above the opening and the cylindrical member, a sleeve secured to the cylindrical wall and including an inner thread formed therein, a rod engaged in the sleeve and including an upper portion, a middle portion having an outer thread formed thereon for engaging with the inner thread of the sleeve, and a lower portion, a knob secured to the upper portion of the rod for rotating the rod, and a cap secured to the lower portion of the rod and including a peripheral flange dependent from the cap for slidably engaging with the outer peripheral surface of the cylindrical member, the cap including a convex lump formed therein for engaging with the cylindrical member, the convex lump slightly projecting inward of the cylindrical member for engaging with the inner peripheral surface of the cylindrical member for making a water tight seal with the cylindrical member.

The lower portion of the rod includes a dove-tail slot formed therein, the cap includes a dove-tail formed thereon for engaging with the dove-tail slot so as to be secured to the rod.

The sleeve includes a first annular flange extended radially outward therefrom for engaging with the cylindrical wall, the water faucet mechanism further includes a barrel secured to the cylindrical wall and having a second annular flange for engaging with the first annular flange of the sleeve so as to secure the sleeve to the cylindrical wall.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 3 and 4 are cross sectional views taken along lines 3—3 of FIG. 1; and

DETAILED DESCRIPTION OF THE PREFERRED EMBODIMENT

Figure 1:
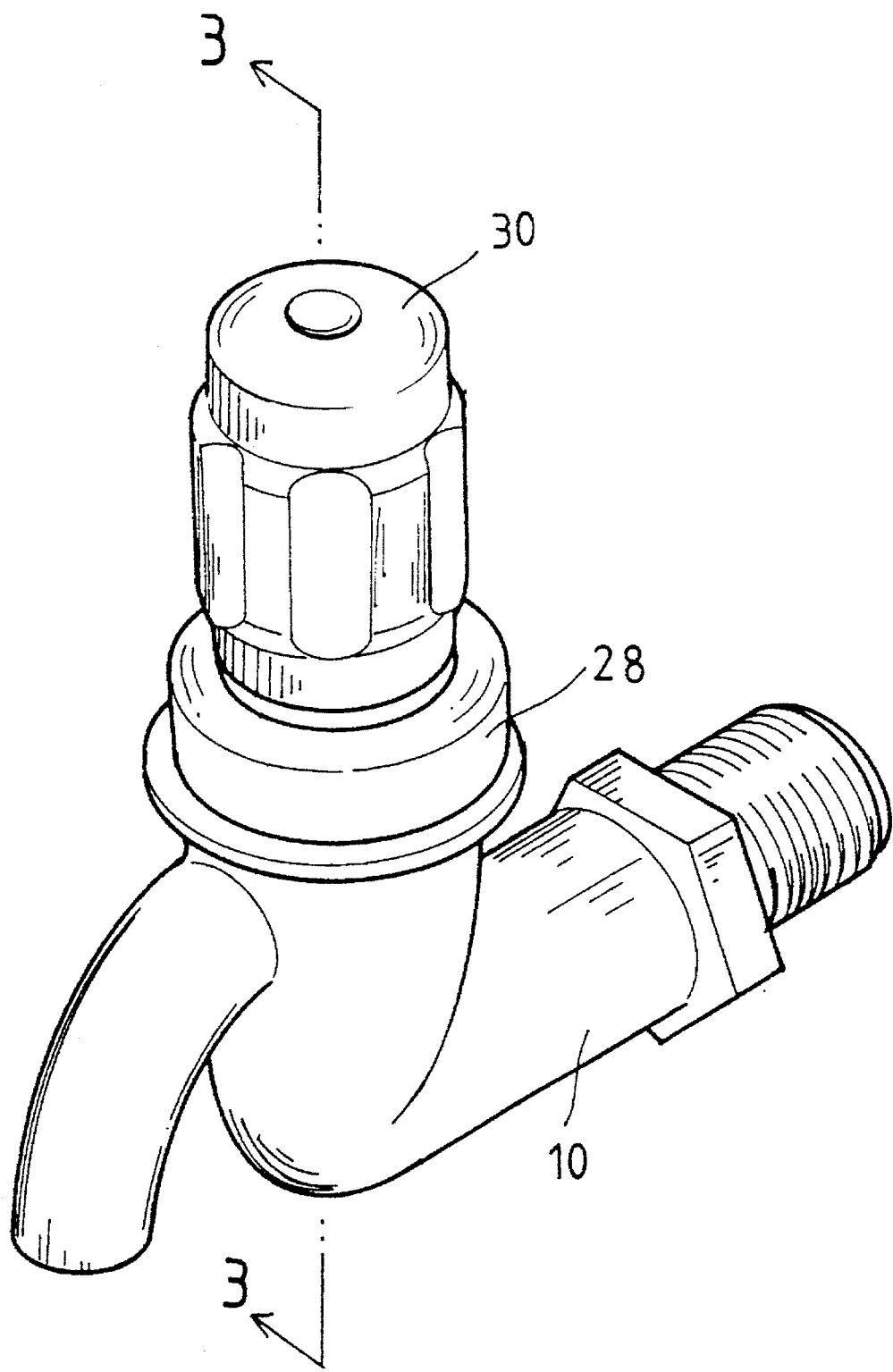
FIG. 1 is a perspective view of a water faucet mechanism in accordance with the present invention.
Figure 2:
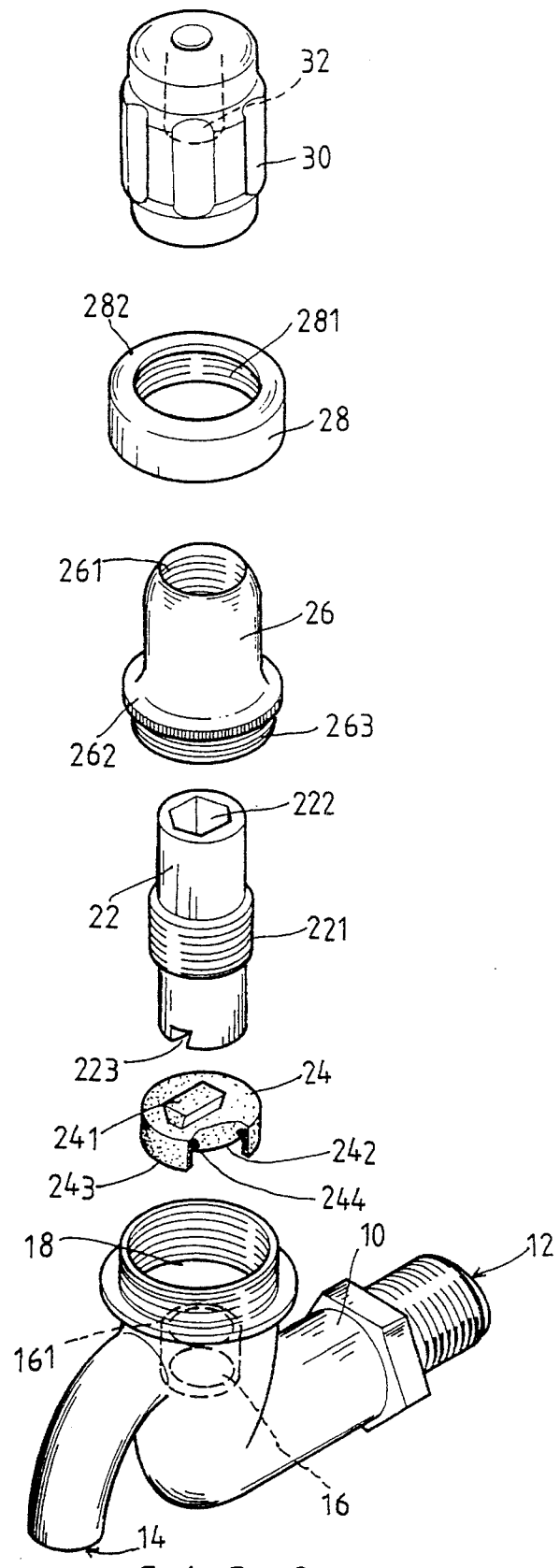
FIG. 2 is an exploded view of the water faucet mechanism.

Referring to the drawings, and initially to FIGS. 1 to 3, a water faucet mechanism in accordance with the present invention comprises a body 10 including a water inlet 12, a water outlet 14 and an opening 16 formed in the body 10 for communicating the water inlet 12 and outlet 14. A cylindrical member 161 is formed in the body 10 and extends upward from the peripheral portion of the opening 16. The body 10 includes a cylindrical wall 18 located above the cylindrical member 161 and having an inner thread and an outer thread formed therein.

A sleeve 26 includes an outer thread 263 formed in the lower portion for engaging with the inner thread of the cylindrical wall 18 so as to be secured to the body 10 and includes an annular flange 262 for engaging with the cylindrical wall 18. The sleeve 26 further includes an inner thread 261 formed therein. A barrel 28 includes an inner thread 281 formed therein for engaging with the outer thread of the cylindrical wall 18 and includes an annular flange 282 extended radially inward for engaging with the annular flange 262 such that the sleeve 26 can be solidly secured to the body 10. A rod 22 is engaged in the sleeve 26 and includes an outer thread 221 formed in the middle of the outer peripheral portion for threadedly engaging with the inner thread 261 of the sleeve 26 such that the rod 22 may be moved up and down in the sleeve 26 when the rod 22 is rotated. The rod 22 includes a cavity 222 formed in the upper portion and having a hexagonal cross section for engaging with a projection 32 of a knob 30. The projection 32 also includes a hexagonal cross section for force-fitted in the hexagonal cavity 222 such that the rod 22 may be rotated by the knob 30. The lower end of the rod 22 includes a dove-tail slot 223 therein. A cap 24 includes a dove-tail 241 formed in the upper portion for engaging with the dove-tail slot 223 of the rod 22 so as to be secured to the rod 22. The cap 24 includes a peripheral flange 243 dependent from the peripheral portion of the cap 24 for sliding engagement with the outer peripheral portion of the cylindrical member 161 and includes a convex lump 242 formed therein. A sealing ring 244 is engaged in the abutment portion of the peripheral flange 243 and the convex lump 242 for engaging with the cylindrical member 161 so as to form a water tight seal for enclosing the opening 16.

Figure 4:
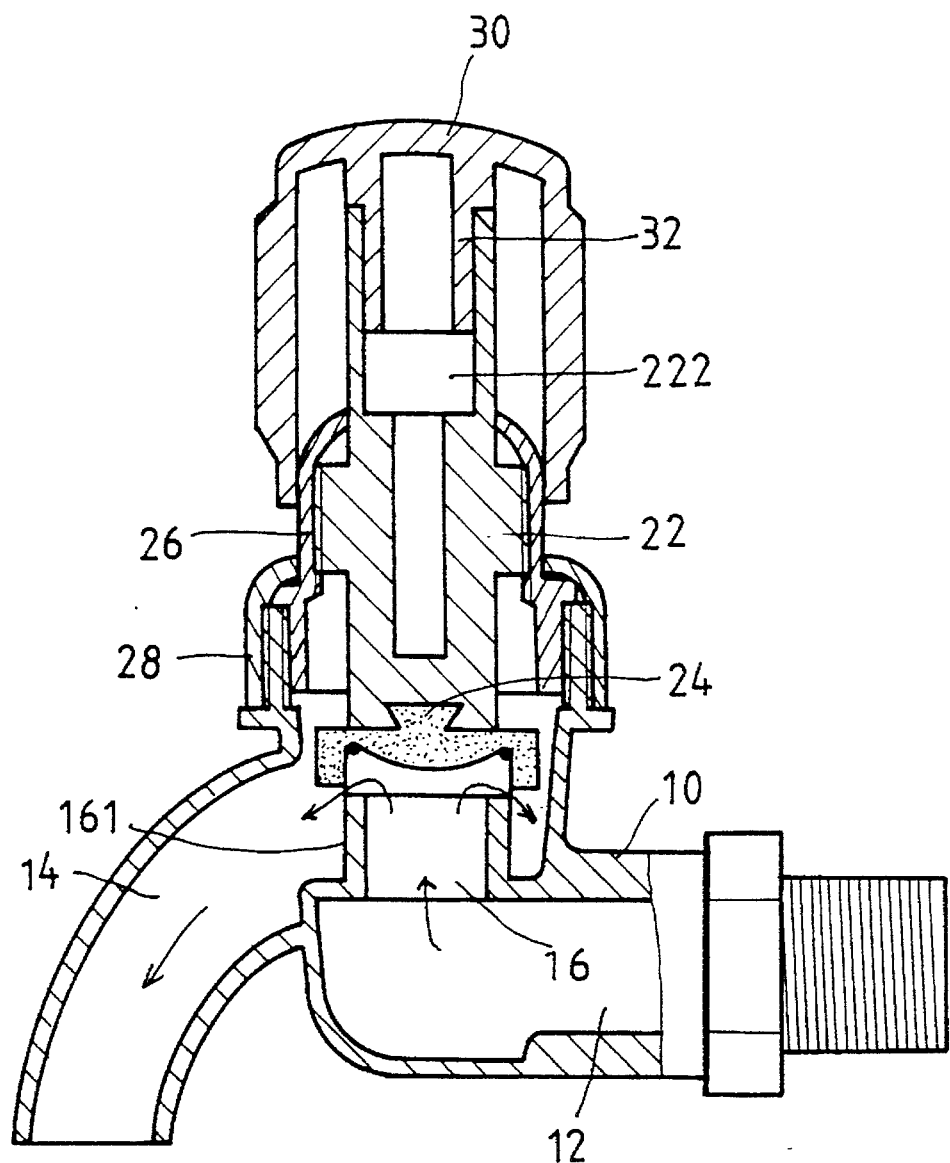
Figure 5:
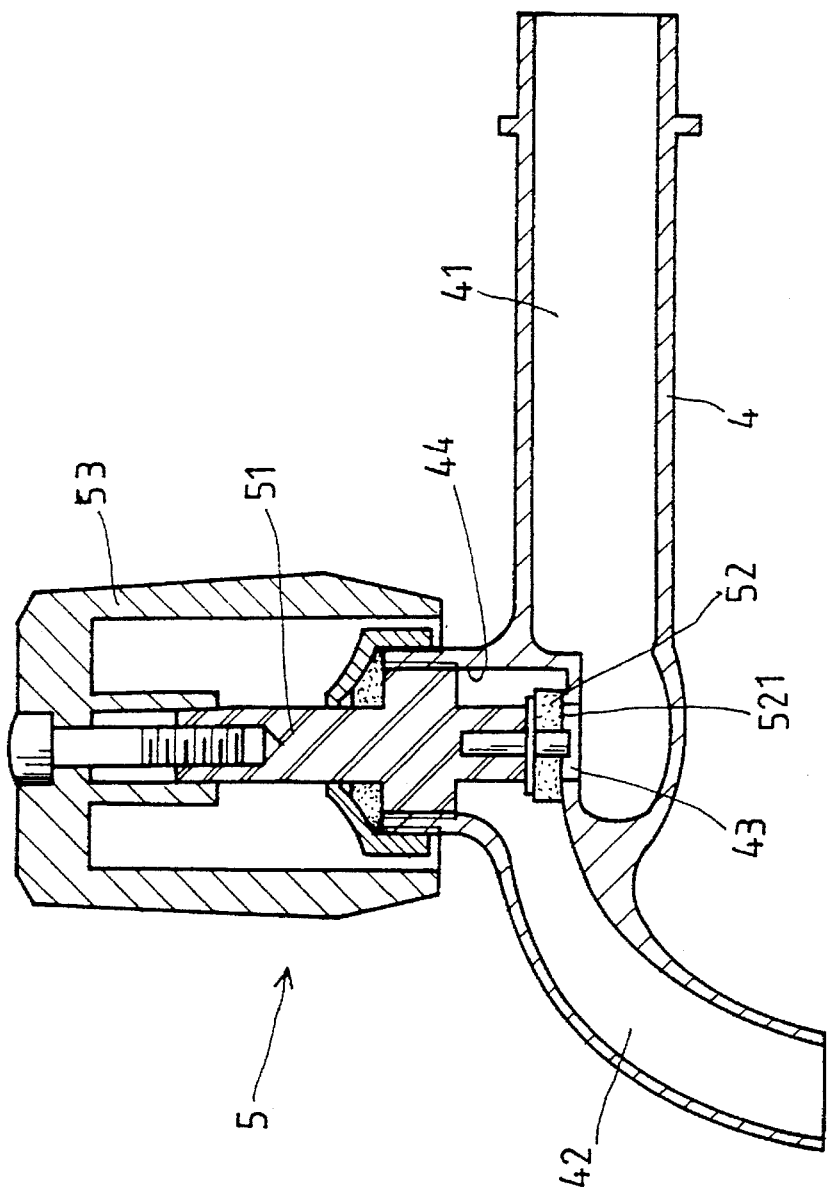
FIG. 5 is a cross sectional view illustrating a typical water faucet.

In operation, as shown in FIGS. 3 and 4, the rod 22 may be moved upward and downward by rotation of the knob 30 so as to disengage and engage the cap 24 with the cylindrical member 161 in order to open and close the opening 16. It is to be noted that the convex lump 242 may slightly project inward of the cylindrical member 161 for engaging with the inner peripheral surface of the cylindrical member 161 such that the cap 24 may be tightly sealed to the cylindrical member 161. It is unnecessary to tightly force the cap 24 against the cylindrical member 161.

Accordingly, the water faucet mechanism in accordance with the present invention includes a cap for engaging with the cylindrical member such that the water passage may be easily opened and closed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water faucet mechanism comprising:
   a body including a water inlet, a water outlet and an opening formed between said water inlet and said water outlet, said opening including a peripheral portion, a cylindrical member extended upward from said peripheral portion of said opening and including an outer peripheral surface and an inner peripheral surface, said body including a cylindrical wall formed above said opening and said cylindrical member,
   a sleeve secured to said cylindrical wall and including an inner thread formed therein,
   a rod engaged in said sleeve and including an upper portion, a middle portion having an outer thread formed thereon for engaging with said inner thread of said sleeve, and a lower portion,
   a knob secured to said upper portion of said rod for rotating said rod, and
   a cap secured to said lower portion of said rod and including a peripheral flange dependent from said cap for slidably engaging with said outer peripheral surface of said cylindrical member, said cap including a convex lump formed therein for engaging with said cylindrical member, said convex lump slightly projecting inward of said cylindrical member for engaging with said inner peripheral surface of said cylindrical member for making a water tight seal with said cylindrical member.

2. A water faucet mechanism according to claim 1, wherein said lower portion of said rod includes a dove-tail slot formed therein, said cap includes a dove-tail formed thereon for engaging with said dove-tail slot so as to be secured to said rod.

3. A water faucet mechanism according to claim 1, wherein said sleeve includes a first annular flange extended radially outward therefrom for engaging with said cylindrical wall, said water faucet mechanism further includes a barrel secured to said cylindrical wall and having a second annular flange for engaging with said first annular flange of said sleeve so as to secure said sleeve to said cylindrical wall.

* * * * *